July 30, 1968      D. A. MASSA ET AL      3,395,319
COMBINATION HIGH-VOLTAGE MOUNTING ASSEMBLY
Filed April 2, 1965      2 Sheets-Sheet 1
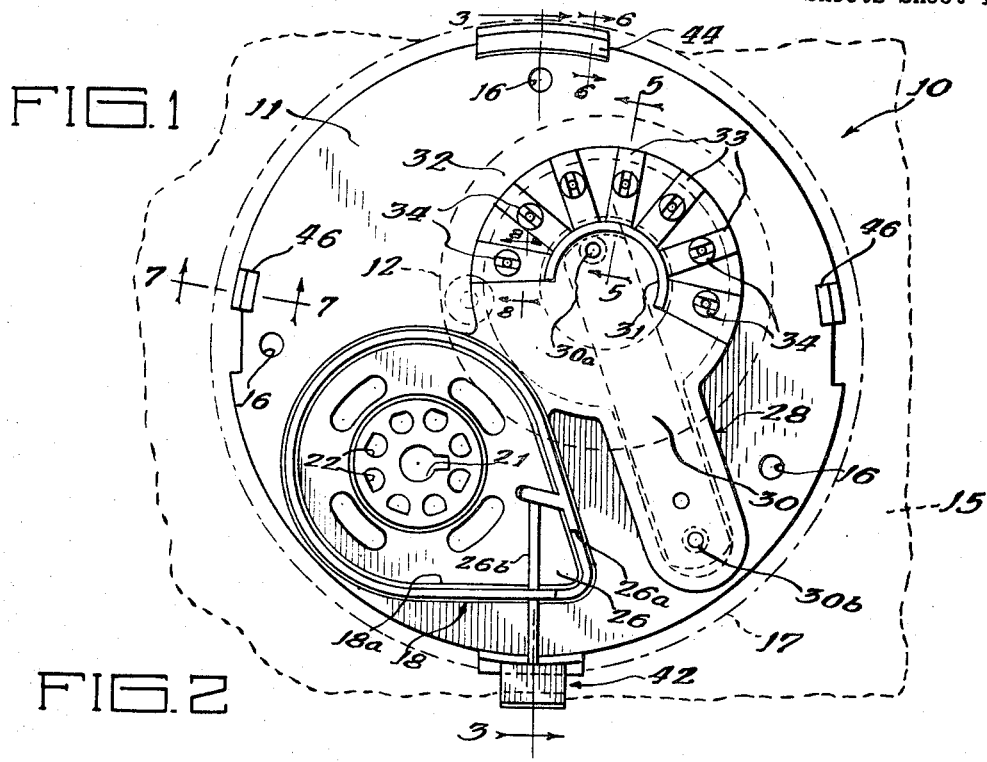
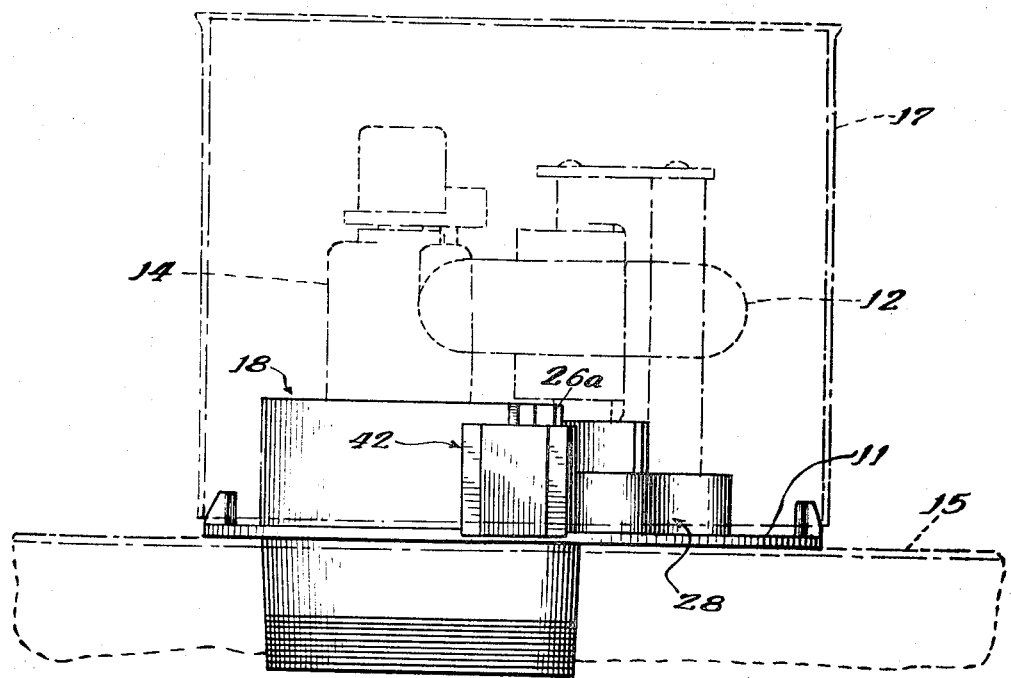
Inventors:
Dominick A. Massa
Richard W. Cushing
By: Hofgren, Wegner, Allen,
Stellman & McCord
Attorneys July 30, 1968    D. A. MASSA ET AL    3,395,319
COMBINATION HIGH-VOLTAGE MOUNTING ASSEMBLY
Filed April 2, 1965    2 Sheets-Sheet 2

United States Patent Office 3,395,319
Patented July 30, 1968

3,395,319
COMBINATION HIGH-VOLTAGE
MOUNTING ASSEMBLY
Dominick A. Massa, Arlington Heights, and Richard W. Cushing, Forest Park, Ill., assignors to Warwick Electronics Inc., a corporation of Delaware
Filed Apr. 2, 1965, Ser. No. 445,002
4 Claims. (Cl. 317—101)

This invention relates to a new and improved combination transformer and tube mounting for use in high voltage applications, such as in television receivers or the like.

It has been a former practice in high voltage applications, such as television sets or the like, to mount a transformer and associated rectifier tube on separate mountings. Depending upon the tolerances of the separate mountings in which the transformer and rectifier tube were mounted, the distances between the two might differ or range within a given tolerance which could affect the output of the high-voltage enclosure in which the tube and transformer were encased and therefore affect the performance of the television receiver. Also, it is often desirable to test the transformer and rectifier together for performance, and yet when the two components were mounted on separate mountings this presented certain difficulties.

It is therefore a primary object of this invention to provide a new and improved high-voltage transformer assembly.

It is another object of this invention to provide a new and improved high-voltage transformer assembly wherein the transformer and rectifier tube are mounted on a common base.

Another object of this invention is to provide a new and improved high-voltage transformer assembly wherein the transformer and rectifier tube may be tested together as a unit.

Yet another object of this invention is to provide a new and improved high-voltage transformer assembly which reduces the possibilities of arcing and shorting in the assembly.

Still another object of this invention is to provide, a new and improved high-voltage transformer assembly having an easily removable cover which may be tightly secured over the assembly to enclose the same in a manner which greatly reduces the passage of air into the interior of the assembly.

Other objects, features and advantages of the present invention will be apparent from the following description of the preferred embodiments illustrated in the accompanying drawings, in which:

FIGURE 1 is a top plan view of the mounting assembly of this invention;

FIGURE 2 is a side elevational view thereof with the transformer and rectifier tube and enclosure can shown in dotted outline;

Figure 3:
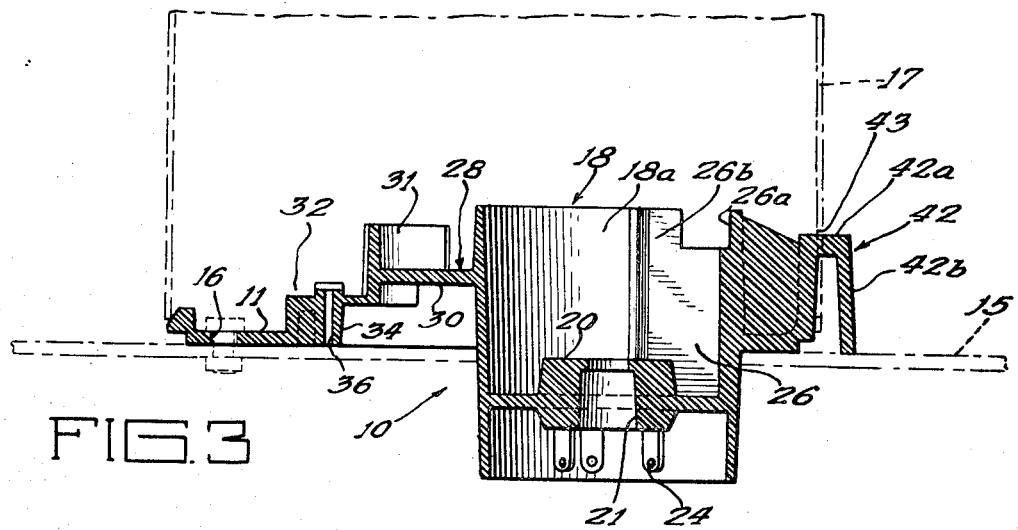
FIGURE 3 is a section view through the mounting assembly taken along the line 3—3 of FIGURE 1.
Figure 4:
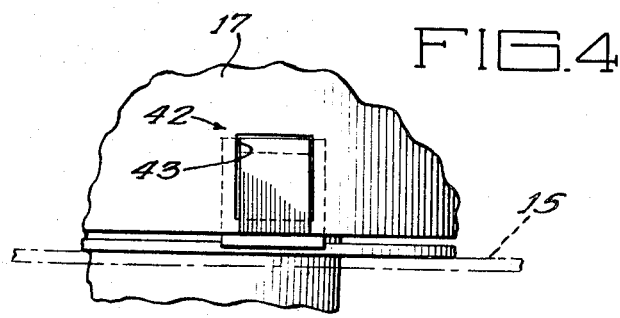
FIGURE 4 is a fragmentary view of a portion of the enclosure can and mounting assembly showing the hinging of the cover to the base of the assembly.
Figure 5:
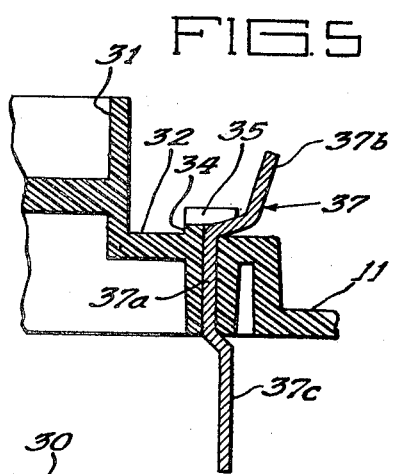
FIGURE 5 is an enlarged fragmentary sectional view taken along the line 5—5 of FIGURE 1 showing the mounting of the transformer terminals to the base of the assembly.
Figure 6:
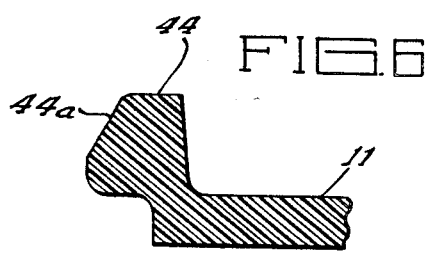
FIGURE 6 is an enlarged fragmentary sectional view taken along the line 6—6 of FIGURE 1.
Figures 7, 8:
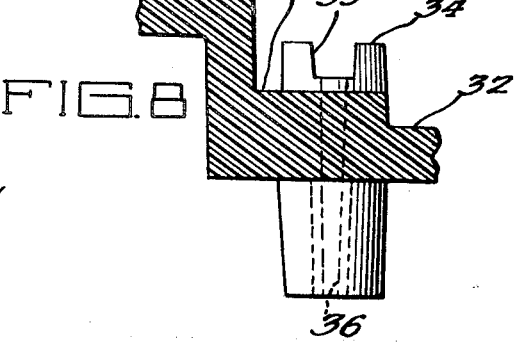
FIGURE 7 is an enlarged fragmentary sectional view taken along the line 7—7 of FIGURE 1.
FIGURE 8 is an enlarged fragmentary sectional view taken along the line 8—8 of FIGURE 1 showing the transformer terminal mounting sleeve.

Referring now to the drawings, the mounting assembly 10 of this invention includes a disc-like base 11 preferably formed of a polyethylene plastic to which a transformer 12 and rectifier tube 14 are to be mounted. The assembly is intended to be secured to the chassis 15 of a television receiver by means of suitable fasteners which may extend through the openings 16 in the base 11. A metallic can-like cover 17 is provided for enclosing the assembly to shield the assembly from the remaining component structures which may also be mounted to the chassis 15.

The base 11 is provided with a first electrical component receiving portion or rectifier tube well 18. The well 18 is substantially oval shaped in plan and the interior wall 18a forms a generally oval shaped sleeve which projects both above and below the base 11. A tube socket 20 is provided intermediate the ends of the sleeve, having a tube guide boss opening 21 and circumferentially disposed tube pin openings 22. Terminals 24 are mounted in the pin openings 22, and the extent of the sleeve 18a is such that the outermost projection of the terminals 24 is within the sleeve of the well. A wiring channel 26 is provided in the generally apex-like end sleeve below the socket up through a notch 26a in the wall of the well. Wall or partition 26b which encloses the channel from the remainder of the well 18 provides a shielded passage for wiring which leads from the terminals 24 out of the rectifier tube well to related electrical components to insulate and protect the wiring extending through the channel from the remainder of the well.

The base 11 is provided with a second component mounting portion 28. Mounting portion 28 is vertically offset from the remainder of the base, forming a generally keyhole-shaped island in plan. The portion 28 is subdivided into two sub portions, transformer mounting sub-portion 30 and terminal mounting sub-portion 32. The transformer mounting sub-portion 30 extends generally between openings 30a and 30b which are provided for mounting the transformer to the base separate from the mounting of the base to the chassis by means of openings 16. The upraised, arcuate, lip 31 generally describes the forward terminus of the transformer mounting sub-portion of the mounting portion 28.

The terminal mounting sub-portion 32 is vertically offset relative to both the base 11 and sub-portion 30, being formed generally as a stepped shoulder therebetween. Included in the sub-portion 32 are a plurality of generally radially extending ribs 33 which have circumferentially disposed terminal supporting sleeves 34 formed therein. The terminal supporting sleeves 34 are generally elongate structures which project slightly above, and substantially below, the ribs 33. The sleeves are notched at upper end 35 and provided with an elongate opening 36 therethrough for receiving suitable terminals 37. Preferably the terminals are rectangular in cross-section and may be of the variety known commonly as "Keller lugs."

The terminals 37 are mounted in the sub-portion 32 in a unique manner which reduces both the cost and time of assembly. The terminals are merely pushed through the openings 36 so that the mid portion 37a is substantially lodged therein. The terminals 37 are then bent or laterally offset relative to the opening to provide an upper laterally offset portoin 37b and a lower laterally offset portion 37c which prevents the axial withdrawal of the terminal relative to the opening 36. Moreover, the sides of the notch 35 also prevent the terminal from rotating relative to the opening 36 so that the terminals are firmly and securely held in the opening 36 by the simple mounting expedient.

The cover 17 may be secured over the base 11 in a novel and unique manner which permits little air to enter into or escape from the enclosure, is relatively firm and will not be accidentally dislodged, and yet which may be easily manually removed for inspection or replacement of the components within the assembly. To this end, the base 11 is provided with a hinge 42 which has a hook portion 42a and a downwardly projecting leg 42b which may be inserted through an opening 43 near the bottom of the cover 17. By means of the connection, the cover 17 may be swung about the hook portion 42a for opening and closing the enclosure. The opening 43 is relatively vertically elongate so that the cover may be swung to a portion where it fully exposes the interior of the enclosure.

The base 11 is further provided with can locking surfaces 44 and 46 which project upwardly from spaced peripheral portions of the base. These surfaces 44 and 46 each have outwardly and downwardly inclined cam surfaces 44a and 46a, respectively, for forcing the cover 17 snugly about the periphery of the base 11 when the cover is swung about the hinge 42 to the closed position.

By forming the rectifier tube socket or well 18 and the mounting portion 28 as an integrally molded structure on a common base, the accuracy of the distance between the components insured in every installation. The one-piece molded base insures the consistency of the optimum lateral as well as vertical dimension between the transformer and the rectifier tube. Moreover, should different vertical relationships be desired in different applications of the high-voltage assembly, this requires only a change in the relatively upright or vertical dimensions of the transformer mounting portion 28, the well 18, and the socket 20, all of which may be easily accomplished without substantially changing the mold structure which is utilized to mold the member 11. The common mounting of the transformer and rectifier tube provides a convenient means for testing the two as a unit. The cover 17 is secured to the assembly in such a manner as to prevent little air to enter into the interior of the enclosure so that the fire hazards in the interior of the enclosure are significantly reduced, if not substantially eliminated. Moreover, although the cover is firmly held to the base, it may be relatively easily withdrawn for inspection into the interior of the enclosure. The transformer terminals are mounted in a novel and unique manner which eliminates the need for any manual manipulations since the terminals are simply pushed through the terminal openings and then laterally offset. Furthermore, the transformer itself is mounted to the base by means of the holes 30a and 30b, separate from the mounting of the base to the chassis through the holes 16. Previous mounting structures for transformers of this nature have incorporated a common mounting of the transformer to the base and the base to the chassis which frequently caused undesirable noises. Finally, the deep well in which the rectifier tube is mounted and the complete enclosure of the terminals which project outwardly from the socket for the rectifier tube, as well as the protected channel for the wiring also embrace the safety of this assembly. Thus the high-voltage enclosure of this invention is a relatively simply molded structure which possesses many safety features as well as features which reduce component production and assembly costs.

The foregoing detailed description has been given for clearness of understanding only, and no unnecessary limitations should be understood therefrom, as some modifications may be obvious to those skilled in the art.

We claim:

1. For use in a wave signal receiver having a chassis for mounting signal receiving and presentation components, a high-voltage mounting assembly, comprising: a member of insulating material formed to provide a base portion arranged for juxtaposition against the signal receiving chassis, the periphery of the base being provided with a hook on one portion thereof and the remainder of the periphery of the base being provided with a plurality of spaced cam portions, the hook being constructed and arranged to impale an opening in a can-like cover for swingably mounting the cover to the base, and the cam portions being constructed and arranged to engage the interior of the cover to secure the cover to the base; a sleeve integrally formed in the base, said sleeve providing a tube receiving opening and having a tube socket therein; a transformer mounting surface integrally formed in said member closely adjacent to said sleeve, said transformer mounting surface being spaced above and connected to said base so as to be spaced above the chassis when the high-voltage assembly is mounted thereto.

2. For use in a wave signal receiver having a chassis for mounting signal receiving and presentation components, a high voltage mounting assembly, comprising: a member of insulating material formed to provide a base portion arranged for juxtaposition against the signal receiver chassis; a sleeve integrally formed in the base, said sleeve providing a tube receiving opening and having a tube socket therein, said sleeve further including connecting portions of the interior of the sleeve and defining thereby a lead wire channel in the sleeve separate from the tube opening; a transformer mounting surface integrally formed in said member closely adjacent to said sleeve, said transformer mounting surface being spaced above and connected to said base so as to be spaced above the chassis when the high voltage assembly is mounted thereto.

3. A mounting base for a high-voltage rectifier tube and flyback transformer used in a television set comprising in combination,
   (a) a base plate arranged to be mounted on the associated television set chassis,
   (b) a pad for receiving said transformer formed integrally with said plate,
   (c) a socket cup for receiving said tube, said socket cup being formed intergrally with said plate, and said socket cup having upstanding side walls which shield the bottom portion of said tube from said transformer,
   (d) a spacer wall formed internally in said socket cup for forming a passageway for the leads emanating from said tube to shield said leads from said tube.

4. A mounting base as in claim 3, wherein
   (a) a wall is formed with said cup in a direction along the axis of the cup to form a passageway for the electrical leads extending for the pins in said tube to the associated electronic circuitry, said wall and passageway protecting and shielding said leads from said tube, which tube when in operation becomes heated.

References Cited

UNITED STATES PATENTS

| | | | |
|---|---|---|---|
| 1,659,303 | 2/1928 | Rovere | 339—198 X |
| 2,176,212 | 10/1939 | Dijksterhuis | 317—101 |
| 2,717,366 | 9/1955 | Summerer | 339—143 X |
| 3,035,210 | 5/1962 | Setchell | 325—352 X |
| 3,130,350 | 4/1964 | Antalek | 317—101 |

FOREIGN PATENTS

| | | |
|---|---|---|
| 650,270 | 10/1962 | Canada. |

ROBERT K. SCHAEFER, *Primary Examiner.*